United States Patent
Cai et al.

(10) Patent No.: US 10,857,656 B2
(45) Date of Patent: Dec. 8, 2020

(54) LEVELING DEVICE AND EASY-TO-LEVEL DISPLAY SCREEN

(71) Applicant: ROE Visual Co., Ltd., Shenzhen (CN)

(72) Inventors: Danhu Cai, Shenzhen (CN); Yongfei Yu, Shenzhen (CN); Shunwen Tian, Shenzhen (CN); Ping Wu, Shenzhen (CN); Sen Zhang, Shenzhen (CN); Zhanqiang Li, Shenzhen (CN); Chen Lu, Shenzhen (CN); Dries Vermeulen, Shenzhen (BE)

(73) Assignee: Roe Visual Co., Ltd., Shenzhen (CN)

( * ) Notice: Subject to any disclaimer, the term of this patent is extended or adjusted under 35 U.S.C. 154(b) by 288 days.

(21) Appl. No.: 16/032,598

(22) Filed: Jul. 11, 2018

(65) Prior Publication Data
US 2018/0318985 A1 Nov. 8, 2018

Related U.S. Application Data

(63) Continuation of application No. PCT/CN2018/082564, filed on Apr. 10, 2018.

(30) Foreign Application Priority Data

Apr. 11, 2017 (CN) .......................... 2017 1 0233905

(51) Int. Cl.
*B25B 11/02* (2006.01)
*G09F 9/00* (2006.01)
(Continued)

(52) U.S. Cl.
CPC .............. *B25B 11/02* (2013.01); *B23P 19/10* (2013.01); *B23Q 5/027* (2013.01); *B25B 5/006* (2013.01); *G09F 9/00* (2013.01); *G09F 9/3026* (2013.01)

(58) Field of Classification Search
CPC ........ G02F 2001/133322; G02F 2001/133302; G02F 2001/133314; G02F 2001/133325;
(Continued)

(56) References Cited

U.S. PATENT DOCUMENTS

| | | | | |
|---|---|---|---|---|
| 2,289,514 A | * | 7/1942 | Mastney | F16F 15/067 248/624 |
| 3,198,324 A | * | 8/1965 | Kallenbach | F16F 3/10 206/320 |

(Continued)

*Primary Examiner* — Tyrone V Hall, Jr.
(74) *Attorney, Agent, or Firm* — Muncy, Geissler, Olds & Lowe, P.C.

(57) ABSTRACT

The present invention discloses a leveling device for adjusting an installation gap between a first component and a second component. The first component and the second component respectively have a cooperative installation surface, the cooperative installation surface of the first component is provided with at least one leveling device; the leveling device comprises a driving device installed in the cooperative installation surface of the first component and an adjustment head rotatably connected to the driving device, the adjustment head moves upwardly or retracts downwardly relative to the cooperative installation surface of the first component; the driving device drives the adjustment head to protrude outside an installation position thereof and abut with the second component located on an opposite side of the installation position of the adjustment head to adjust the gap between the first and second component. The present invention relates to an easy-to-level display screen using the leveling device.

13 Claims, 4 Drawing Sheets

(51) Int. Cl.
*B25B 5/00* (2006.01)
*B23Q 5/027* (2006.01)
*B23P 19/10* (2006.01)
*G09F 9/302* (2006.01)

(58) Field of Classification Search
CPC ......... G02F 1/133308; Y10T 29/53683; Y10T 29/53891; H05K 5/0017; H05K 5/0217
See application file for complete search history.

(56) References Cited

U.S. PATENT DOCUMENTS

| | | | | |
|---|---|---|---|---|
| 3,758,058 A | * | 9/1973 | Neudeck | F16F 15/067 |
| | | | | 410/46 |
| 6,189,876 B1 | * | 2/2001 | Frazier | B25B 11/005 |
| | | | | 269/21 |
| 2008/0239197 A1 | * | 10/2008 | Kasuga | G02F 1/133308 |
| | | | | 349/59 |

* cited by examiner

LEVELING DEVICE AND EASY-TO-LEVEL DISPLAY SCREEN

CROSS REFERENCE TO RELATED APPLICATIONS

This application is a Continuation of co-pending Application No. PCT/CN2018/082564, filed on Apr. 10, 2018, for which priority is claimed under 35 U.S.C. § 120; and this application claims priority of Application No. 201710233905.7 filed in China on Apr. 11, 2017 under 35 U.S.C. § 119, the entire contents of all of which are hereby incorporated by reference.

TECHNICAL FIELD

The present invention relates to a leveling device and a display device, and more particularly, to a leveling device and a easy-to-level display screen.

BACKGROUND

The existing display screen usually includes a display screen frame and a display screen installed in the display screen frame, wherein a signal connector of the display screen is connected to a signal interface on the display screen frame. After the display screen is installed, the problems of incorrect installation of the display screen and the uneven splicing between the screens are difficult to be avoided. Since both the frame and the display screen are provided with a magnet, and the two are adsorbed by the magnets, the display screen and the frame are tightly installed. When the display screen needs to be adjusted, it needs to be realized by, for example, adjusting the tightness of screw thereon or adjusting the frame after the display screen is entirely disassembled. Therefore, the adjustment is not very convenient and direct.

SUMMARY

The present invention aims at providing a leveling device and a easy-to-level display screen to overcome the defects of the prior art above. The present invention is convenient in use, saves time and labor, and facilitates the adjustment of the display screen installed in the frame.

In order to achieve the object above, the present invention provides a leveling device for adjusting an installation gap between a first component and a second component, and the first component and the second component respectively have a cooperative installation surface;

the cooperative installation surface of the first component is provided with at least one leveling device;

the leveling device comprises a driving device installed in the cooperative installation surface of the first component and an adjustment head rotatably connected to the driving device, and the adjustment head moves upwardly or retracts downwardly relative to the cooperative installation surface of the first component; and the driving device drives the adjustment head to protrude outside an installation position thereof and abut with the second component located on an opposite side of the installation position of the adjustment head, so as to adjust the gap between the first component and the second component.

Preferably, the adjustment head comprises an upper cover head, an inner core body and an elastic supporting piece, a center of the upper cover head is provided with a concave containing cavity, an opening of the containing cavity is arranged towards the cooperative installation surface, the inner core body is arranged in the containing cavity, an inner wall of the containing cavity is formed as an arc surface curved towards an external direction of the adjustment head, an outer wall of the inner core body is cooperatively installed with a spherical surface of the inner wall of the containing cavity to enable the inner core body to rotate in the containing cavity, the elastic supporting piece is arranged between the upper cover head and the cooperative installation surface to support the inner core body on the cooperative installation surface of the first component, and the driving device is connected to the inner core body in a transmission way.

Preferably, the driving device is a motor, the driving device has an output rod with an external thread, a center of the inner core body is provided with a screw hole in threaded connection with the output rod, and the output rod is in threaded and rotational connection with the inner core body of the adjustment head.

Preferably, the installation position of the driving device is provided with a positioning head for positioning the driving device on the cooperative installation surface, the positioning head has a boss arranged protruding to the direction of the upper cover head and a flange surrounding around the outer side of the boss, a center of the inner core body is provided with a concave socket for cooperatively installed with the boss, the inner core body is installed in the boss through the socket, a height of the boss is smaller than a depth of the socket to form an adjustment gap, a center of the positioning head is provided with a through hole for the output rod of the driving device to penetrate through, and the output rod of the driving device is in threaded connection with the inner core body after passing through the through hole in sequence.

Preferably, the elastic support is a spring.

Preferably, the elastic supporting piece is arranged corresponding to at least one of the upper cover head and the inner core body.

The present invention further relates to an easy-to-level display screen, the easy-to-level display screen comprises a display screen and a frame, the display screen is a first component, the frame is a second component, the display screen and the frame are cooperatively installed, the display screen is provided with a leveling device, and the leveling device is the leveling device according any one of the items above.

Preferably, a groove for containing the leveling device is arranged in the second component at a position corresponding to the leveling device, and when the first component and the second component are cooperatively installed, the leveling device is just contained in the groove to facilitate the leveling device to clamp the second component.

The present invention further relates to an easy-to-level display screen comprising a display screen and a frame, the frame is a first component, the display screen is a second component, the frame and the display screen are cooperatively installed, the frame is provided with a leveling device, and the leveling device is the leveling device according any one of the items above.

Preferably, a groove for containing the leveling device is arranged in the second component at a position corresponding to the leveling device, and when the first component and the second component are cooperatively installed, the leveling device is just contained in the groove to facilitate the leveling device to clamp the second component.

The present invention further relates to an easy-to-level display screen comprising a display screen and a frame, the display screen is a first component, the frame is a second component, the display screen and the frame are cooperatively installed, the display screen and the frame are both provided with a leveling device, and the leveling device is the leveling device according to any one of the items above.

Preferably, grooves for containing the adjustment head of the leveling device are arranged on both a position of the second component corresponding to the leveling device of the first component and a position of the first component corresponding to the leveling device of the second component, and when the first component and the second component are cooperatively installed, the adjustment head of the leveling device is just contained in the groove to facilitate the leveling device to clamp.

The present invention has the beneficial effects that: by arranging the leveling device on the cooperative installation surface of the first component, the leveling device comprises the driving device installed in the cooperative installation surface of the first component and the adjustment head rotatably connected to the driving device, the driving device drives the adjustment head to protrude outside the installation position thereof, and the adjustment head pushes each position of the first component or the second component provided with the adjustment head to one side, so that the first component or the second component keeps even connection relative to the first component or the second component in the adjacent side thereof, thereby preventing a display plane of the adjacent first component or second component from generating a misaligned angle to result in poor display effects. Moreover, manual adjustment is not required in adjustment, so that the entire use is more convenient. The present invention has a simple overall structure, is easy to produce and manufacture, has low cost, is easy to use, has strong adaptability, and saves time and labor.

Figure 1:
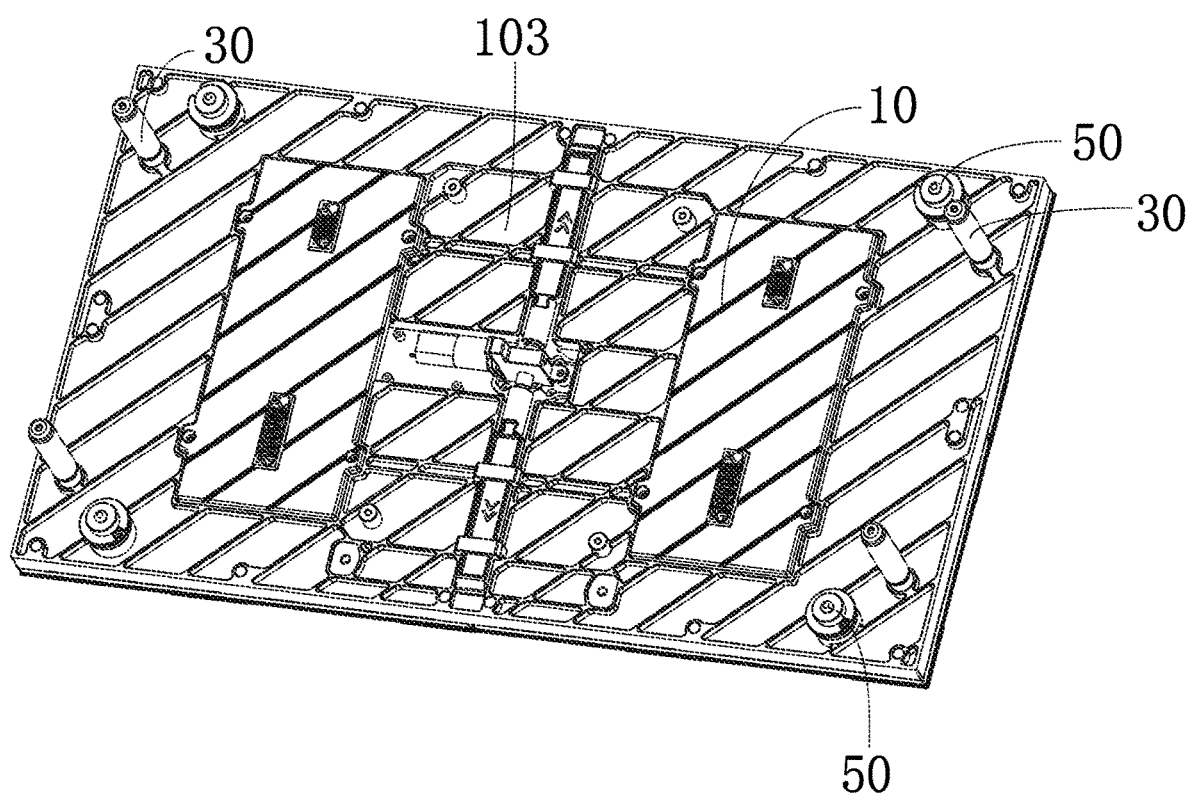
FIG. 1 is a schematic diagram illustrating an overall structure of the present invention.

REFERENCE NUMERALS 10 refers to first component; 101 refers to cooperative installation surface of first component;

20 refers to second component; 201 refers to cooperative installation surface of second component; 202 refers to groove;

30 refers to guidepost; 40 refers to guide hole;

50 refers to leveling device; 501 refers to driving device; 5011 refers to output rod; 502 refers to adjustment head; 5021 refers to upper cover head; 5022 refers to inner core body; 5023 refers to elastic supporting piece; 5024 refers to containing cavity; 5025 refers to socket; 503 refers to positioning head; 5031 refers to boss; 5032 refers to through hole; 5033 refers to adjustment gap; 5034 refers to outer edge; 5035 refers to top head; 5036 refers to main body; and 5037 refers to step groove.

The object implementation, functional features and advantages of the present invention will be further described with reference to the embodiments and accompanying drawings.

DETAILED DESCRIPTION OF THE EMBODIMENTS

The embodiments of the present invention will be described in detail hereinafter, the examples of the embodiments are shown in the accompanying drawings, wherein the same or similar reference numerals throughout the drawings denote the same or similar elements or the elements having the same or similar functions. The embodiments described below with reference to the accompanying drawings are exemplary and are intended to explain the present invention, but cannot be construed as limiting the present invention.

Figure 2:
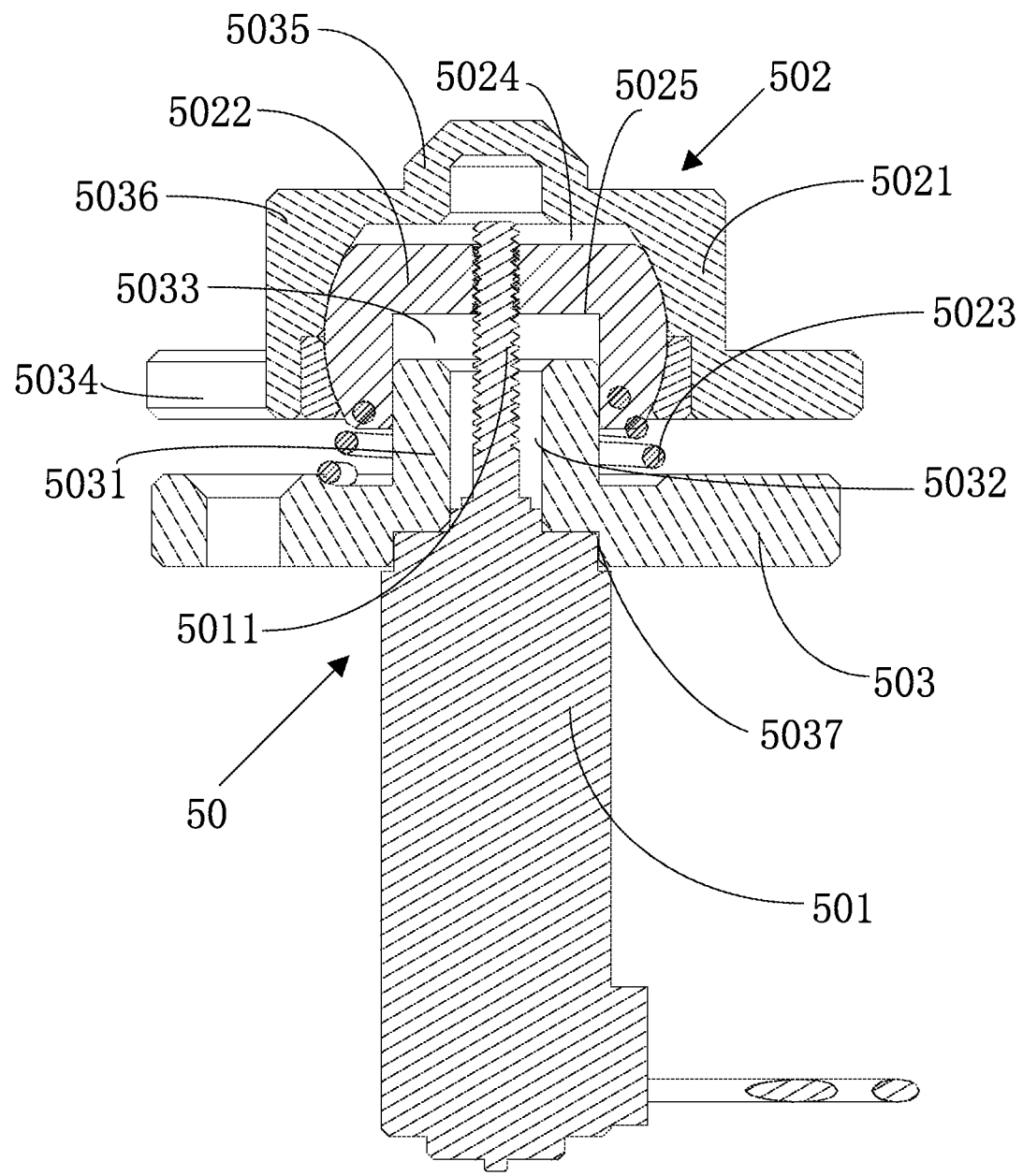
FIG. 2 is a schematic diagram illustrating a section structure of a leveling device of the present invention.
Figure 3:
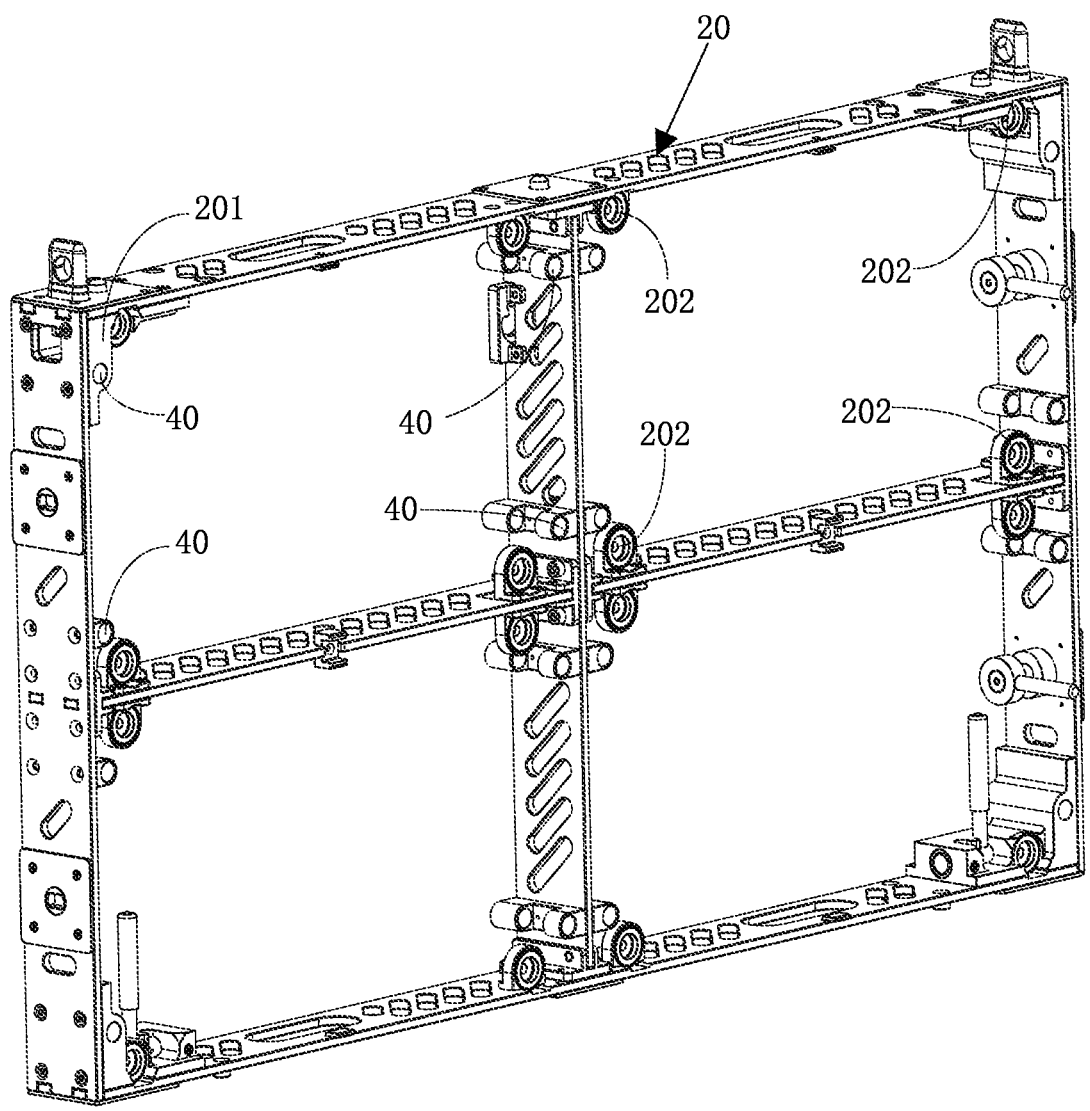
FIG. 3 is a schematic diagram illustrating a structure of a frame of the present invention.
Figure 4:
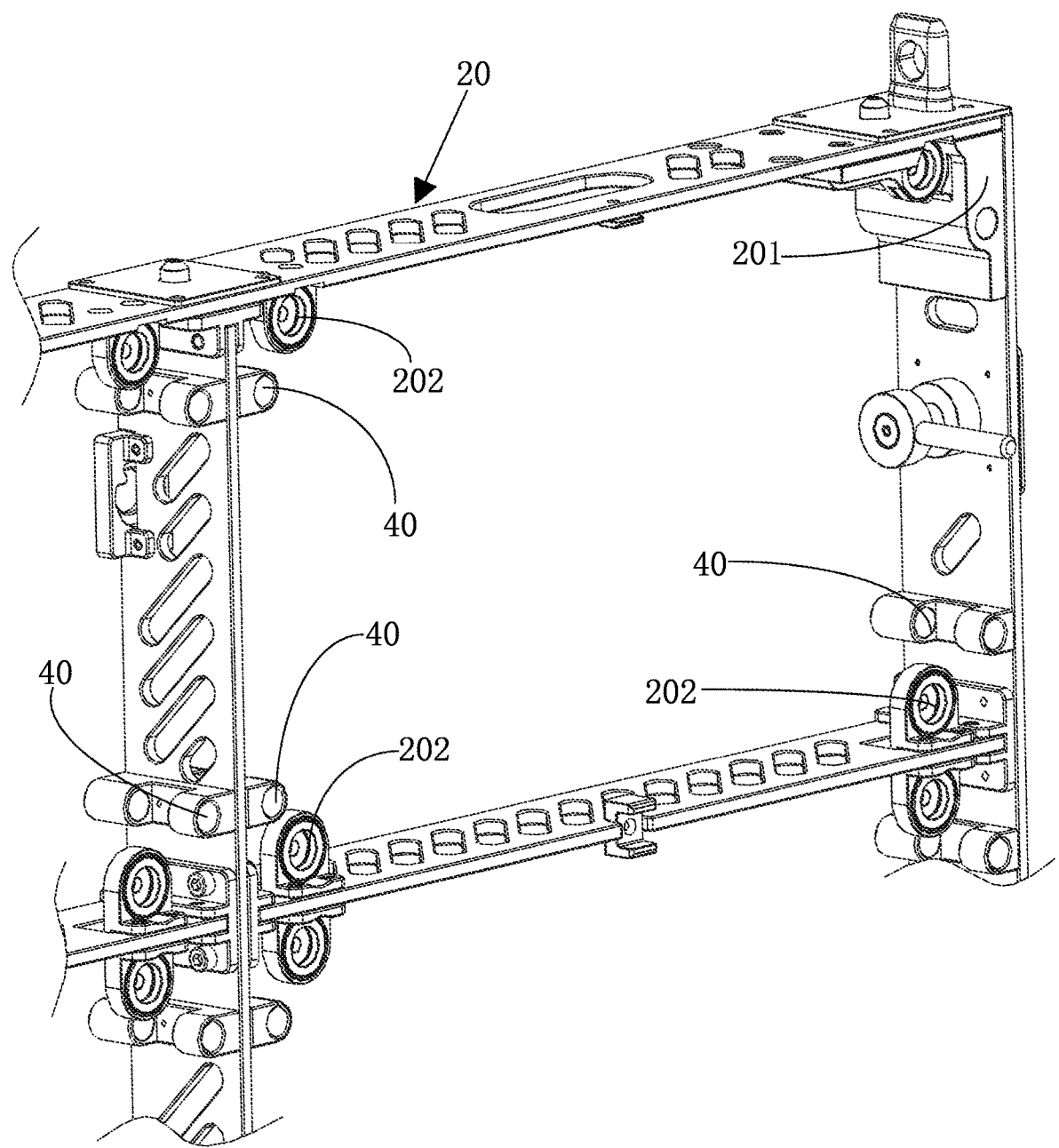
FIG. 4 is a partial enlarged schematic diagram of the frame of the present invention.

Referring to FIG. 1 to FIG. 4, in a first embodiment of the present invention below, a first component is configured as a frame, a second component is configured as a display screen, the frame is adsorbed with the display screen by a magnet, the frame and the display screen are cooperatively installed, and when the display screen and the frame become an integrated easy-to-level display screen after assembly, the frame is provided with the leveling device. This embodiment is also a main embodiment of the present invention in practical application, the present invention provides a leveling device for adjusting an installation gap between a first component 10 and a second component 20, the first component 10 and the second component 20 respectively have a cooperative installation surface, and the cooperative installation surface 101 of the first component is provided with at least one leveling device 50; the leveling device 50 comprises a driving device 501 installed in the cooperative installation surface 101 of the first component and an adjustment head 502 rotatably connected to the driving device 501, and the adjustment head 502 moves upwardly or retracts downwardly relative to the cooperative installation surface 101 of the first component; and the driving device 501 drives the adjustment head 502 to protrude outside an installation position thereof and abut with the second component 20 located on an opposite side of the installation position of the adjustment head 502, so as to adjust the gap between the first component 10 and the second component 20.

In the embodiment above, and during the specific installation and use, the leveling device 50 is preferably arranged at each angular position of the first component 10, so as to facilitate the leveling device 50 to adjust the angular position of the first component 10. The adjustment head 502 can move upwardly or retract downwardly relative to the cooperative installation surface 101 of the first component through driving a motor, and when some position of the first component 10 is lower than the other first component 10 on the adjacent side, the position is lifted up by the leveling device 50 to facilitate connecting the adjacent sides of the first components 10, thereby achieving the object of leveling.

Further, the adjustment head 502 comprises an upper cover head 5021, an inner core body 5022 and an elastic supporting piece 5023, a center of the upper cover head 5021 is provided with a concave containing cavity 5024, an opening of the containing cavity 5024 is arranged towards the cooperative installation surface, the inner core body 5022 is arranged in the containing cavity 5024, an inner wall of the containing cavity 5024 is formed as an arc surface curved towards an external direction of the adjustment head 502, an outer wall of the inner core body 5022 is cooperatively installed with a spherical surface of the inner wall of the containing cavity 5024 to enable the inner core body 5022 to rotate in the containing cavity 5024, so that a spherical surface is formed between the inner core body 5022 and the containing cavity 5024 of the upper cover head 5021 for cooperative installation. The elastic supporting piece 5023 is arranged between the upper cover head 5021 and the cooperative installation surface to support the inner core body 5022 on the cooperative installation surface 101 of the first component, and the driving device 501 is connected to the inner core body 5022 in a transmission way. In order to make the adjustment head 502 have the function of rotational adjustment, the adjustment head 502 is internally provided with the inner core body 5022, so that the inner core body 5022 can rotate in the adjustment head 502, and regardless of the position of the driving device 501, the adjustment head 502 can always align and abut with the second component 20 vertically, thereby maintaining a maximum contact surface between the adjustment head 502 and the second component 20.

Further, the driving device 501 is a motor, the driving device 501 has an output rod 5011 with an external thread, a center of the inner core body 5022 is provided with a screw hole in threaded connection with the output rod 5011, and the output rod 5011 is in threaded and rotational connection with the inner core body 5022 of the adjustment head 502. The driving device 501 is connected to the inner core body 5022 in a transmission way, and when the driving device 501 rotates, the inner core body 5022 drives the upper cover head 5021 to move telescopically.

Further and specifically, the driving device 501 is configured as a motor, the output rod 5011 of the motor is in threaded and rotational connection with the inner core body 5022 of the adjustment head 502, when the output rod 5011 of the motor rotates, the inner core body 5022 can move along the output rod 5011, so as to change the position of the adjustment head 502, and since the inner core body 5022 is cooperatively installed with the spherical surface of the upper cover head 5021, when the adjustment to a certain angle of direction is needed, the upper cover head 5021 can generate a certain angle of deflection, this situation is suitable when the first component 10 or the leveling device 50 itself are not manufactured and installed correctly, and the upper cover head 5021 can always be maintained to align with the second component 20, so as to avoid inaccurate leveling, slippage or poor leveling effect in the case that the leveling device 50 is inclined.

Further, the installation position of the driving device 501 is provided with a positioning head 503 for positioning the driving device on the cooperative installation surface, the positioning head 503 has a boss 5031 arranged protruding to the direction of the upper cover head 5021 and a flange surrounding around the outer side of the boss 5031, a center of the inner core body 5022 is provided with a concave socket 5025 for cooperatively installed with the boss 5031, the inner core body 5022 is installed in the boss 5031 through the socket 5025, a height of the boss 5031 is smaller than a depth of the socket 5025 to form an adjustment gap 5033, a center of the positioning head 503 is provided with a through hole 5032 for the output rod 5011 of the driving device 501 to penetrate through, and the output rod 5011 of the driving device 501 is in threaded connection with the inner core body 5022 after passing through the through hole 5032 in sequence.

Further, in order to better install the leveling device 50 in the first component 10, a positioning head 503 is sleeved on the driving device 501, a center of the positioning head 503 has a boss 5031, an outer side of the boss 5031 has a flange, a connecting screw is arranged on the flange to allow the positioning head 503 to be positioned on the first component 10 through the connecting screw, a center of the inner core body 5022 is provided with a concave socket 5025 for cooperatively installed with the boss 5031, the inner core body 5022 is installed in the boss 5031 through the socket 5025, and a height of the boss 5031 is smaller than a depth of the socket 5025 to form an adjustment gap 5033, so as to give a compression and support space of the elastic supporting piece 5023.

Preferably, the upper cover head 5021 is specifically formed into a hat-like shape with an outer edge horizontally extending outwards, a middle portion thereof is provided with a convex main body 5036 for forming the containing cavity 5024, and a middle portion of a top surface of the main body 5036 is provided with an top head 5036 with a radius smaller than that of the main body, so that the entire upper cover head forms a left-right symmetrical outline with a step from a the direction of longitudinal section. A top head 5035 and the main body 5036 can just be contained in the groove, and the groove is also internally provided with the step cooperated with the top head and the main body, which can be in favor of positioning of the upper cover head in the groove. One side of the positioning head 503 facing towards the motor is provided with a step groove 5037, so that the positioning head 503 can be better positioned on the motor, the flange of the positioning head 503 is provided with a screw hole, when a screw is arranged in the screw hole of the positioning head 503 to connect the positioning head 503 to the cooperative installation surface, the positioning head is pressed by the flange, and the motor is pressed by the positioning head, so that the motor is fixedly installed in the cooperative installation surface to reduce the movement and the pulsation of the motor during operation.

Further, the elastic supporting piece is a spring. The elastic supporting piece 5023 can play a role of buffering the force when the adjustment head 502 is stressed to lift up the second component 20, thus reducing the impact of the external force on the driving device 501.

Further, the elastic supporting piece 5023 is arranged corresponding to at least one of the upper cover head 5021 and the inner core body 5022. A size scope of the elastic supporting piece 5023 may either be the position of the inner core body 5022 only, or be extended to the position of the upper cover head 5021 as well, or may be the arranged position of the upper cover head 5021 only.

In the first embodiment of the present invention, since the display screen is a first component 10 and the frame is a second component 20, when the leveling device 50 is used in this display device, an easy-to-level display screen is obtained namely. The display screen is cooperatively installed with the frame, the display screen is provided with the leveling device 50, in a specific installation and use process, a groove 202 for containing the adjustment head of the leveling device 50 is arranged on a position of the second component 20 corresponding to the leveling device 50, and that is, the groove 202 is arranged on a position of the frame corresponding to the leveling device 50. When the display screen is cooperatively installed with the frame, an end part of the adjustment head of the leveling device 50 is just contained in the groove 202, and the leveling device 50 can be positioned through the groove 202 while moving, so as to facilitate the leveling device 50 to clamp the frame, thus avoiding relative sliding of the frame in movement of the leveling device 50 and the problem of failed leveling.

Since the upper cover head 5021 is specifically formed into a hat-like shape, the middle portion thereof is provided with the convex main body 5036 for forming the containing cavity 5024, the main body 5036 is provided with the top head 5035, and an entire longitudinal section thereof forms a stepped boss, the groove 202 will also be arranged into a stepped hole, the size thereof is adapted with the size of the upper cover head 5021, so that the upper cover head 5021 can just be cooperatively clamped with the step groove of the groove 202, so as to more effectively define the position of the adjustment head.

In the embodiment above, each easy-to-level display screen can further be provided with the guidepost 30 for guiding the first component 10 to move on the second component 20, and the cooperative installation surface 101 of the first component is provided with at least one guidepost 30; at least one guide hole 40 is arranged at a position of the cooperative installation surface 201 of the second component corresponding to the guidepost 30; and The guidepost 30 is inserted into the guide hole 40, and when the first component 10 is pushed, the first component 10 can move along the guide hole 40 through the guidepost 30. Therefore, when the leveling device 50 is cooperatively used with the guidepost 30, the guidepost 30 can play a role for supporting the first component 10, thus avoiding the problem of loosening generated by increased distance between the first component 10 and the second component 20 due to over-adjustment of the leveling device 50.

The guidepost 30 is vertically arranged relative to the cooperative installation surface 101 of the first component. Certainly, other angles between the guidepost 30 and the cooperative installation surface 101 of the first component can also be formed, which is not limited herein. The guidepost 30 is arranged vertical to the cooperative installation surface 101 of the first component, so that after the display screen is separated from the frame, the display screen can be more conveniently removed from the frame when the operator takes away the display screen, which is also convenient for the operator to observe the state of the display screen after separating from the frame.

Further, the guidepost 30 is a buffer such as an air-pressure rod, a hydraulic pressure rod, or an air spring, a fixed end of the guidepost 30 being a buffer such as an air-pressure rod, a hydraulic pressure rod, or an air spring is fixedly installed with the display screen or the frame, and since the other end of the guidepost 30 being a buffer such as an air-pressure rod, a hydraulic pressure rod, or an air spring is a movable end, the guidepost 30 can be retracted. Therefore, the end is arranged towards the guide hole 40, after the display screen and the frame are assembled, the movable end is located in the guide hole 40, through a pushing effect of the unloading device, when the first component 10 is separated from the second component 20, a movable end of the guidepost 30 will give a counter elastic force to the first component 10 to pop from the second component 20, or an air spring will give a counter elastic force to the second component 20 to pop from the first component 10, so as to further increase the separation force of the first component 10 or the second component 20, so that the distance between the first component 10 and the second component 20 is further increased, and the first component 10 or the second component 20 can be conveniently and automatically disassembled, thus reducing the occurrence of the failed disassembly.

The guidepost 30 is entirely an elongated cylinder having circular cross-section, which facilitates better processing and installation, and can effectively increase the sliding distance of the first component 10 on the second component 20 or the sliding distance of the second component 20 on the first component 10, thus avoiding the problem that the first component 10 or the second component 20 falls off directly. Certainly, the guidepost 30 can also be an elongated cylinder having square cross-section, or an elongated cylinder having elliptical cross-section, and certainly, the cross-section shape of the guidepost 30 is not limited to the various shapes above.

Since the cooperative installation surface of the first component 10 is provided with at least one guidepost, at least one guide hole 40 is arranged at a position of the cooperative installation surface of the second component 20 corresponding to the guidepost, and the guidepost is inserted into the guide hole 40, when the pushing mechanism 50 applies a reaction force to the first component 10 while butting with the second component 20, the guidepost moves along the guide hole 40.

The position of the guidepost can be any position arranged at the display screen or the frame. For example, one or more positions of the guidepost can be arranged at all angular positions of the display screen or the frame, multiple positions of the guidepost can also be arranged along the side of the display screen or the frame, and the position of the guidepost can also be arranged at the center of the display screen or the frame. The guide hole 40 can be arranged corresponding to the position of the guidepost.

When the leveling device 50 is reversely installed according to the installation mode of the first embodiment, the second embodiment of the present invention is obtained, and in the second embodiment of the present invention, the frame is a first component 10, and the display screen is a second component 20. Therefore, when the leveling device 50 is used in this display device, another easy-to-level display screen is obtained. The frame is cooperatively installed with the display screen, the frame is provided with the leveling device 50, in specific installation and use process, a groove 202 for containing the adjustment head of the leveling device 50 is arranged on a position of the second component 20 corresponding the leveling device 50, and that is, the groove 202 is arranged on a corresponding position of the display screen. When the display screen is cooperatively installed with the frame, an end part of the adjustment head of the leveling device 50 is just contained in the groove 202, and the leveling device 50 can be positioned through the groove 202 while moving, so as to facilitate the leveling device 50 to clamp the display screen, thus avoiding relative sliding of the display screen in movement of the leveling device 50 and the problem of failed leveling.

In third embodiment of the present invention, the display screen is a first component 10, and the frame is a second component 20. Therefore, when the leveling device 50 is used in this display device, another easy-to-level display screen is obtained. The display screen is cooperatively installed with the frame, the display screen and the frame are both provided with the leveling device 50, and in a specific installation and use process, grooves 202 for containing the adjustment head of the leveling device 50 are arranged on both a position of the second component corresponding to the leveling device 50 of the first component 10 and a position of the first component 10 corresponding to the leveling device 50 of the second component 20. When the first component 10 is cooperatively installed with the second component 20, an end part of the adjustment head of the leveling device 50 is just contained in the groove 202, and the leveling device 50 can be positioned through the groove 202 while moving, so as to facilitate the leveling device 50 to clamp the display screen, thus avoiding relative sliding of the display screen in movement of the leveling device 50 and the problem of failed leveling.

In conclusion, the leveling device and the easy-to-level display screen provided by the present invention are simple in structure and convenient in use, and can effectively improve the leveling effect of the screen.

Although the embodiments of the present invention have been shown and described above, it can be understood that the embodiments above are exemplary and cannot be construed as limiting the present invention. Those skilled in the art can change, modify, replace and deform the embodiments above in the scope of the present invention without departing from the principle and purpose of the present invention.

The invention claimed is:

1. A leveling device for adjusting an installation gap between a first component and a second component, the first component and the second component respectively having a cooperative installation surface, wherein:
   the cooperative installation surface of the first component is provided with at least one leveling device;
   the leveling device comprises a driving device installed in the cooperative installation surface of the first component and an adjustment head rotatably connected to the driving device, and the adjustment head moves upwardly or retracts downwardly relative to the cooperative installation surface of the first component; and
   the driving device drives the adjustment head to protrude outside an installation position thereof and abut with the second component located on an opposite side of the installation position of the adjustment head, so as to adjust the gap between the first component and the second component,
   wherein the adjustment head comprises an upper cover head, an inner core body and an elastic supporting piece, a center of the upper cover head is provided with a concave containing cavity, an opening of the containing cavity is arranged towards the cooperative installation surface, the inner core body is arranged in the containing cavity, the elastic supporting piece is arranged between the upper cover head and the cooperative installation surface to support the inner core body on the cooperative installation surface of the first component, and the driving device is connected to the inner core body in a transmission way.

2. The leveling device according to claim 1, wherein an inner wall of the containing cavity is formed as an arc surface curved towards an external direction of the adjustment head, an outer wall of the inner core body is cooperatively installed with a spherical surface of the inner wall of the containing cavity to enable the inner core body to rotate in the containing cavity.

3. The leveling device according to claim 1, wherein the driving device is a motor, the driving device has an output rod with an external thread, a center of the inner core body is provided with a screw hole in threaded connection with the output rod, and the output rod is in threaded and rotational connection with the inner core body of the adjustment head.

4. The leveling device according to claim 2, wherein the driving device is a motor, the driving device has an output rod with an external thread, a center of the inner core body is provided with a screw hole in threaded connection with the output rod, and the output rod is in threaded and rotational connection with the inner core body of the adjustment head.

5. The leveling device according to claim 1, wherein the installation position of the driving device is provided with a positioning head for positioning the driving device on the cooperative installation surface, and the positioning head has a boss arranged protruding to the direction of the upper cover head and a flange surrounding around the outer side of the boss.

6. The leveling device according to claim 5, wherein a center of the inner core body is provided with a concave socket for cooperatively installed with the boss, the inner core body is installed in the boss through the socket, and a height of the boss is smaller than a depth of the socket to form an adjustment gap.

7. The leveling device according to claim 6, wherein a center of the positioning head is provided with a through hole for the output rod of the driving device to penetrate through, and the output rod of the driving device is in threaded connection with the inner core body after passing through the through hole in sequence.

8. The leveling device according to claim 1, wherein the elastic supporting piece is a spring.

9. The leveling device according to claim 1, wherein the elastic supporting piece is arranged corresponding to at least one of the upper cover head and the inner core body.

10. An easy-to-level display screen, comprising a display screen and a frame, wherein the display screen is a first component, the frame is a second component, the display screen and the frame are cooperatively installed, the display screen is provided with a leveling device, and the leveling device is the leveling device according to claim 1.

11. The easy-to-level display screen according to claim 10, wherein a groove for containing the adjustment head of the leveling device is arranged in the second component at a position corresponding to the leveling device, and when the first component and the second component are cooperatively installed, the adjustment head of the leveling device is just contained in the groove to facilitate the leveling device to clamp the second component.

12. An easy-to-level display screen comprising a display screen and a frame, the frame is a first component, the display screen is a second component, the frame and the display screen are cooperatively installed, the frame is provided with a leveling device, and the leveling device is the leveling device according to claim 1.

13. The easy-to-level display screen according to claim 12, wherein a groove for containing the adjustment head of the leveling device is arranged on the second component at a position corresponding to the leveling device, and when the first component and the second component are cooperatively installed, the adjustment head of the leveling device is just contained in the groove to facilitate the leveling device to clamp the second component.

* * * * *